United States Patent [19]

Inoue

[11] Patent Number: 4,459,454
[45] Date of Patent: Jul. 10, 1984

[54] MACHINING-LIQUID SUPPLY SYSTEM FOR TRAVELING-WIRE ELECTROEROSION MACHINING

[75] Inventor: Kiyoshi Inoue, Tokyo, Japan
[73] Assignee: Inoue-Japax Research Incorporated, Yokohama, Japan
[21] Appl. No.: 390,122
[22] Filed: Jun. 18, 1982
[30] Foreign Application Priority Data Jun. 24, 1981 [JP] Japan ............................ 56-93403[U]

[51] Int. Cl.$^3$ ............................ B23P 1/16; B23P 1/08
[52] U.S. Cl. ................................ 219/69 D; 219/69 W
[58] Field of Search ............. 219/69 W, 69 D, 69 M, 219/69 V, 69 R; 204/129.6, 129.7

[56] References Cited

U.S. PATENT DOCUMENTS 4,205,212  5/1980  Ullmann et al. ................. 219/69 W

FOREIGN PATENT DOCUMENTS 2904797  8/1979  Fed. Rep. of Germany ... 219/69 D
2018662  10/1979  United Kingdom ........... 219/69 W Primary Examiner—M. H. Paschall
Attorney, Agent, or Firm—Karl F. Ross; Herbert Dubno

[57] ABSTRACT

An improved machining-liquid supply system for traveling-wire electroerosion machining is disclosed which comprises a machining-liquid ejecting nozzle disposed on one side of a workpiece and traversed by the traveling wire electrode for injecting a thin stream of the machining liquid into the cutting zone in the workpiece. A cover member is disposed proximate to and so as to surround, the end of the cutting zone on the other side of the workpiece and is formed with a drain duct communicating with a suction source to forcibly draw the machining liquid injected into the cutting zone by the machining-liquid ejecting nozzle. The system further comprises a coolant-ejecting nozzle disposed so as to coaxially surround the machining-liquid ejecting nozzle for ejecting a stream of coolant and enclosing therewith the stream of the machining liquid being injected into the cutting zone.

5 Claims, 2 Drawing Figures

MACHINING-LIQUID SUPPLY SYSTEM FOR TRAVELING-WIRE ELECTROEROSION MACHINING

FIELD OF THE INVENTION

The present invention relates to traveling-wire electroerosion machining and, more particularly, to a new and improved machining-liquid supply system for traveling-wire electroerosion machining of the type in which a wire electrode is axially transported from a supply means to a takeup means through a workpiece while traversing the workpiece linearly across the thickness thereof and the workpiece is displaced relative to the traveling wire electrode transversely to the axis thereof while electrical machining current is passed between the traveling wire electrode and the workpiece to electroerosively remove material from the latter. The term "wire electrode" is used herein to refer to a thin, continuous, elongate electrode which is commonly in the form of a wire but may be of a tape or ribbon form. The invention is particularly concerned with a continuous machining-liquid replenishment system in which a machining liquid, e.g. a distilled water medium, is injected into the cutting zone in the workpiece by means of an injection nozzle disposed at one side of the workpiece so as to be open in the direction of the cutting region, i.e. groove, and is drawn from the cutting region by means of a suction assembly disposed at the other side of the workpiece.

BACKGROUND OF THE INVENTION

In traveling-wire electroerosion machining, the machining liquid, customarily a distilled water liquid, must be continuously supplied and replenished into the cutting region to play important distinct roles, viz. to serve not only as the machining medium to continuously renew the electroerosive action, but as a flushing medium to continuously remove the erosion machining products and contaminants from the cutting zone and at the same time as a coolant to prevent the traveling wire electrode and the workpiece subjected to the high-energy electroerosion cutting action from being excessively heated. thus it is necessary to supply and replenish the machining liquid in the form of a continuous stream into the cutting zone.

To this end it has been customary to employ a nozzle designed to inject into the cutting zone the machining liquid in a stream of relatively high velocity or to provide more than one such nozzle in the region of the workpiece which is customarily disposed in the atmosphere, the stream or streams of the machining liquid being oriented toward the cutting zone or relatively thin continuously developing groove. For example, it has been found to be advantageous to use a pair of injection nozzles arranged to be coaxial with one another and with the traveling wire electrode in such a manner that one nozzle is disposed on one side of the workpiece and the other nozzle on the other side of the workpiece. In such an arrangement, two independent streams of the machining liquid are forced from the opposite sides of the workpiece into the cutting zone and are allowed there to join to flow out through the cut groove behind the cutting zone in the workpiece.

I have now found that the prior nozzle arrangements used in traveling-wire electroerosion machining are not entirely satisfactory to allow a desired cutting speed and accuracy to be obtained. Cooling and flushing tend to be insufficient, particularly in the area in the cutting groove where the two streams injected from the opposite sides of the workpiece join. Furthermore, the ambient air tends to be drawn into the stream ejected from each nozzle towards the thin cutting groove so that entrapped gas bubbles occupy a substantial volume of the machining liquid traversing the passage in the cutting region. It has now been found that this uncontrolled aeration substantially reduces the cutting speed and accuracy and may also be a significant cause of machining instability and the undesirable breakage of the traveling wire electrode.

OBJECT OF THE INVENTION

It is, accordingly, an important object of the present invention to provide a new and improved machining-liquid supply system for use with a traveling-wire electroerosion machine, which system assures a uniform distribution of the flowing machining liquid over the entire thickness of the cutting zone and at the same time minimizes the uncontrolled introduction of the environmental air into the machining liquid stream ejected from a nozzle.

SUMMARY OF THE INVENTION

In accordance with the present invention there is provided a machining-liquid supply system for traveling-wire electroerosion machining wherein a wire electrode is axially transported from a supply side to a takeup side through a workpiece while traversing the workpiece linearly across the thickness thereof and a machining liquid is passed through an electroerosion cutting zone defined between the traveling wire electrode and the workpiece while the latter two are relatively displaced transversely to the axis of the traveling wire electrode to progressively develop an electroerosion cut in the workpiece, which system comprises: nozzle means adapted to be disposed on one side of a said workpiece and to be traversed by a said traveling wire electrode for ejecting a stream of said machining liquid and injecting it into a said cutting zone in the workpiece from the one side thereof; suction means adapted to be disposed essentially in contact with or proximate to said workpiece on the other side thereof and to surround said traveling wire electrode for drawing under suction the machining liquid from said cutting zone; and coolant-ejecting means adapted to surround said nozzle means from the rear side thereof on said one side of the workpiece for ejecting a coolant and enclosing therewith said stream of the machining liquid ejected by said nozzle means.

Preferably, the said one side is the lower surface of the workpiece which is positioned horizontally and the said other side is the upper side of the workpiece. The wire electrode is then arranged preferably to travel through the cutting zone upwards although the opposite direction of axial travel of the wire electrode may also be employed.

Preferably, the suction means comprises a cover member disposed to surround the upper end of said cutting zone and a drain duct for connecting the space within said cover member with a suction source. Preferably, the cover member has its rim portion adapted to be held in light contact with the upper surface of the workpiece. The cover member further includes a guide member, e.g. tubular, for passing the wire electrode freely therethrough.

BRIEF DESCRIPTION OF THE DRAWING

These and other features of the invention as well as advantages thereof will become more readily apparent from a reading of the following description when taken with reference to the accompanying drawing in which.

SPECIFIC DESCRIPTION

Figure 1:
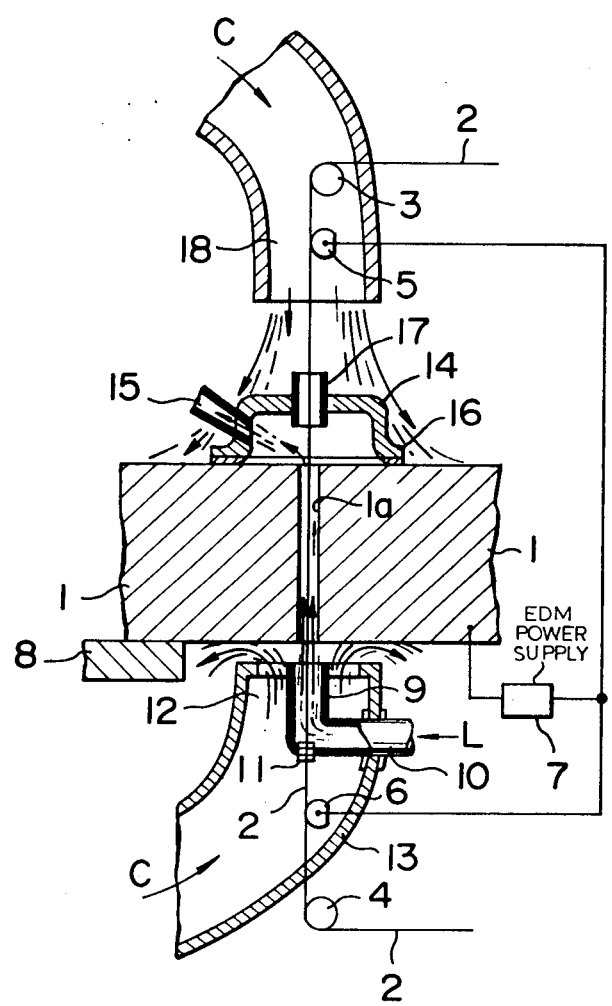
FIG. 1 is a side elevational view, essentially in cross-section, diagrammatically illustrating one embodiment of the present invention.

Referring first to FIG. 1, there is shown a workpiece 1 being electroerosively machined with a wire electrode 2. As is customary, the wire electrode 2 is continuously transported from a supply site to a takeup site through the workpiece 1 while traversing the workpiece 1 from down to up or vice versa through a cutting zone 1a in the workpiece 1. The wire electrode 2 is caused to travel via guide rollers 3 and 4 to provide a linear or straight traveling stretch therebetween. Electrical brushes 5 and 6 which are shown as disposed between the guide roller 3 and the workpiece 1 and between the latter and the guide roller 4, respectively, are electrically connected to one terminal of an electroerosion machining power supply 7 whose other terminal is electrically connected to the workpiece 1 to supply electrical machining current, typically or preferably in the form of a succession of electrical pulses, between the traveling wire electrode 2 and the workpiece 1, thereby electroerosively removing material from the latter across the cutting zone constituting a machining gap. As material removal proceeds, a worktable 8 having the workpiece 1 securely mounted thereon is displaced by a feed drive unit (not shown) typically operated by a numerical-control (NC) unit (not shown) to displace the workpiece 1 transversely to the axis of the traveling wire electrode 2, normally perpendicular or sometimes at an angle thereto, along a desired cutting path so that eventually a desired groove of electroerosion cut with a contour corresponding to the programmed path is formed in the workpiece 1. The cutting zone 1a shown thus represents the forefront of the electroerosion groove for progressive development and moves with the axis of the traveling wire electrode 2 in the workpiece 1.

Located directly beneath and in close proximity to the lower end of the cutting zone 1a is a nozzle opening 9 which communicates via a conduit 10 with a source of machining liquid (not shown) and which coaxially accommodates the wire electrode 1 which slidably passes through a gasket 11 in the conduit 10 for passage into or from the cutting zone 1a in the workpiece 1. The nozzle opening 9 may be circular in cross-section and coaxial with the wire electrode 2 and should have an inner diameter or breadth approximately equal to or not much greater than (up to 20 times) the diameter or breadth of the cutting zone 1a (in the horizonal plane). As a result, a thin stream of the machining liquid L is ejected from the nozzle a and injected into and passes through and out of the cutting zone 1a to sufficiently cool the workpiece portion surrounding the cutting zone and to carry away erosion products therefrom.

The nozzle 9 of small cross-section is accommodated in and surrounded coaxially by a nozzle 12 of greater cross-section which communicates via a conduit 13 with a source of coolant (not shown). The conduit 10 having the nozzle 9 at its end passes through the wall of the conduit 13. The coolant C may be of the same composition as the machining liquid L. The large nozzle 12, shown to be substantially flush with the small nozzle 9, is here designed to eject a stream of coolant C which is annular in cross-section, onto a portion of the lower surface of the workpiece 1 surrounding the cutting zone 1a, thereby enclosing coaxially therewith the thin stream of machining liquid emanating from the small nozzle 9. The stream of coolant C annular in cross-section emanating from the large nozzle 12 thus serves as a fluid curtain for the entire thin stream of machining liquid L emanating from the small nozzle 9 into the cutting zone 1a and thereby sealing the machining-liquid stream L from the atmosphere. In this manner, the machining-liquid stream L issuing from the nozzle 9 and passing through the cutting zone 1a is effectively prevented from disturbance and aeration by the ambient air.

Disposed in close proximity to or in light contact with the upper surface of the workpiece 1 is a cup-shaped suction or cover member 14 formed with a conduit 15 which communicates with a suction pump or negative-pressure source (not shown). The member 14 is shown to be arranged in contact with the workpiece 1 via an annular seal element 16 of elastic material such as rubber and is also formed with a passage 17 through which the wire electrode 1 stretched between the guide rollers 3 and 4 through the cutting zone 1a is freely moved axially. The conduit 15 under the action of the suction source creates a negative pressure in the space between the member 14 and the workpiece 1 to forcibly draw the machining-liquid stream L ejected from the nozzle 9, thereby permitting it smoothly to pass through and out of the cutting zone 1a. Consequently, there results an enhanced cooling of both the workpiece portion and the traveling wire electrode in the cutting zone 1a and a minimization of introduction of air into the machining liquid L passing thrugh the cutting zone 1a. Since the machining liquid L is allowed to smoothly pass through the cutting zone 1a, there will be a sharply reduced cavitation action and a minimized entrapping of gaseous bubbles in the stream other than due to vaporization and bubbling produced by machining electrical discharges. The cover member 14 is provided to prevent the ejection of the injected machining liquid stream on the suction side from being disturbed or becoming of turbulant.

Above the member 14 there is provided a second coolant-ejecting nozzle 18 of large cross-section. The nozzle 18 is designed to eject a stream of the coolant C from a source thereof, which may be the same as the nozzle 12, thereby flooding the coolant C sufficiently over the cover member 14 and regions of the upper surface of the workpiece 1 surrounding the member 14 to sufficiently cool the workpiece 1 and the shield the passage 17 from the atmosphere.

The upper and lower coolant-ejecting nozzles 18 and 12 or their associated conduits are formed with passages through which the wire electrode 2 is freely passed.

Figure 2:
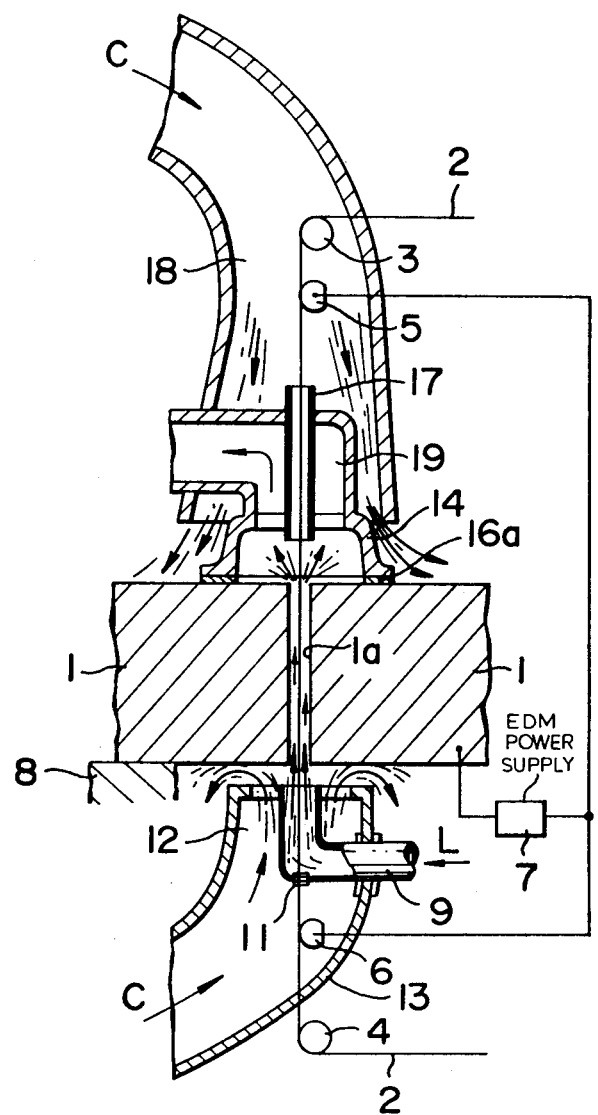
FIG. 2 is a similar view diagrammatically illustrating another embodiment of the invention.

In a modified embodiment shown in FIG. 2 in which the same reference numerals as in FIG. 1 are used to designate the same parts, the cover member 14 is formed with a modified drain or suction conduit 19 which in the region of the top of the cover member 14 is arranged to be coaxial with the passage 17. Furthermore, the second coolant-ejecting nozzle 18 is arranged to partly cover the cover member 14 and hence to locate closer to the workpiece 1.

From the foregoing description, it will be apparent that the system according to the present invention enables a stream of the machining liquid L ejected from a nozzle 9 on one side of the workpiece 1 to be effectively drawn under suction through a drain or suction conduit 15, 19 on the other side of the workpiece 1, thus providing a smooth flow through the cutting zone 1a to sufficiently cool the workpiece 1. By virtue of the provision of a first coolant-ejecting nozzle 12 arranged to coaxially surround the machining-liquid ejecting nozzle 9, the stream of machining liquid L from the latter is sufficiently protected against aeration and is allowed to pass through and out of the cutting zone in a substantially laminar flow practically free from turbulance and cavitation. The drain conduit 15, 19 is led out of a cover member 14 disposed proximate to the downstream side of the workpiece. Further, a second coolant-ejecting nozzle 18 may advantageously be provided proximate to the cover member 14 to eject a second protective coolant flow over the workpiece surface. In this manner it has been found that a marked increase in both the cutting rate and accuracy is obtained.

EXAMPLE

With an arrangement as generally shown in FIG. 1, a workpiece composed of SK6 steel (Japanese Industrial Standard) and having a thickness of 20 mm is machined with a wire electrode composed of copper and having a diameter of 0.2 mm and with a machining liquid L constituted by a distilled water medium having a specific resistance of $5 \times 10^4$ ohm-cm. The machining liquid L is ejected under a pressure of 1.2 kg/cm$^2$ from a nozzle 9 having an inner diameter of 4 mm and an outer diameter of 5 mm and is drawn into a drain or suction conduit 15 under a pressure of 750 mmHg. When a stream of coolant C is ejected from a nozzle 12 having an inner diameter of 10 mm and coaxial with the nozzle 9 to enclose the machining-liquid stream L, an electroerosion cutting rate as high as 3.4 mm/min is obtained. When the coolant-ejecting nozzle 12 is omitted, the cutting rate drops to 2.1 mm/min.

What is claimed is:

1. A machining-liquid supply system for traveling-wire electroerosion machining in which a wire electrode is axially transported from a supply side thereof to a takeup side thereof to linearly traverse a workpiece and a machining liquid is passed through an electroerosion cutting zone defined between the traveling wire electrode and the workpiece while the latter two are relatively displaced transversely to the axis of the traveling wire electrode to progressively develop an electroerosion cut in the workpiece, said system comprising:

nozzle means adapted to be disposed on one side of the workpiece and to be traversed by the traveling wire electrode for ejecting a stream of said machining liquid and injecting it into the cutting zone in the workpiece from said one side thereof;

suction means adapted to be disposed proximate to or in light contact with said workpiece on the other side thereof and to surround said traveling wire electrode for drawing under suction the machining liquid from said cutting zone; and coolant-ejecting means adapted to be disposed to surround said nozzle means on said one side of the workpiece for ejecting a coolant and enclosing therewith said stream of the machining liquid ejected from said nozzle means.

2. The system defined in claim 1 wherein said coolant-ejecting means has a nozzle opening substantially coaxial with and greater in cross-section than the nozzle opening of said nozzle means.

3. The system defined in claim 1 or claim 2 wherein said workpiece has a lower and an upper surface constituting said one and other sides, respectively.

4. The system defined in claim 3 wherein said suction means comprises a cover member adapted to be disposed proximate to and so as to surround, the upper end of said cutting zone, a drain duct leading out of said cover member and communicating with a suction source and a guide member coupled with said cover member for permitting said wire electrode to be freely passed therethrough.

5. The system defined in claim 4, further comprising second coolant-ejecting means adapted to be disposed above said cover member for ejecting a second stream of coolant and flooding it over an upper surface of said workpiece, to cool the latter.

* * * * *